(12) United States Patent
Davies et al.

(10) Patent No.: US 7,343,427 B2
(45) Date of Patent: Mar. 11, 2008

(54) METHOD AND AN APPARATUS FOR THE INTEGRATION OF IP DEVICES INTO A HAVI NETWORK

(75) Inventors: Nigel Andrew Justin Davies, Hala Lancaster (GB); Pierre-Guillaume Raverdy, Santa Clara, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1044 days.

(21) Appl. No.: 09/875,670

(22) Filed: Jun. 5, 2001

(65) Prior Publication Data

US 2002/0073244 A1  Jun. 13, 2002

Related U.S. Application Data

(60) Provisional application No. 60/256,134, filed on Dec. 13, 2000.

(51) Int. Cl.
*G06F 15/16* (2006.01)
(52) U.S. Cl. .................. 709/249; 719/311; 719/321; 719/328; 709/229; 709/230
(58) Field of Classification Search ............... 709/249, 709/318, 220, 223, 230, 229; 710/8, 104; 719/321, 311, 328, 320, 313
See application file for complete search history.

(56) References Cited

U.S. PATENT DOCUMENTS 5,555,244 A 9/1996 Gupta et al.
5,996,025 A 11/1999 Day et al.
6,363,434 B1 * 3/2002 Eytchison .................... 709/313
6,374,404 B1 * 4/2002 Brotz et al. .................... 725/46
6,430,599 B1 * 8/2002 Baker et al. ................. 709/203
6,434,447 B1 * 8/2002 Shteyn ........................ 700/245
6,618,764 B1 * 9/2003 Shteyn ........................ 709/249
6,694,363 B1 * 2/2004 Yamadaji et al. ........... 709/223
2001/0032273 A1 * 10/2001 Cheng ........................ 709/249

FOREIGN PATENT DOCUMENTS

WO   PCT US01/45557   11/2001

* cited by examiner

*Primary Examiner*—Nathan Flynn
*Assistant Examiner*—Mohammad Siddiqi
(74) *Attorney, Agent, or Firm*—Blakely, Sokoloff, Taylor & Zafman LLP (57) ABSTRACT

A method and an apparatus for integrating IP devices into a HAVi network An Internet Protocol (IP) and HAVi compliant device acts as a controller in the HAVi network and communicates with at least on HAVi compliant device using HAVi application programming interfaces (APIs). A server on the controller communicates with at least one IP device having a proxy and an IP and HAVi API. The server includes at least one IP device device control module (IP device DCM) corresponding to the IP device. The IP device providing API support to translate and relay calls between the proxy and the server so that at least one HAVi compliant device can communicate with the IP device.

28 Claims, 6 Drawing Sheets

METHOD AND AN APPARATUS FOR THE INTEGRATION OF IP DEVICES INTO A HAVI NETWORK

This application claims the benefit of the filing date of the following Provisional U.S. Patent Application:

"METHOD AND APPARATUS FOR THE INTEGRATION OF IP DEVICES INTO A HAVI NETWORK", application No. 60/256,134, filed Dec. 13, 2000.

FIELD OF THE INVENTION

The present invention relates generally to HAVi networks and, more particularly, to a method and an apparatus for integrating IP devices into a HAVi Network.

BACKGROUND OF THE INVENTION

HAVi, home audio/video initiative, is a digital audio visual (AV) networking initiative that provides a home networking software specification for seamless interoperability among home entertainment products. The HAVi specification actually defines a set of criteria that enables compliant AV devices to interoperate in a home network. The specification lays down application program interfaces, APIs, which can be, used by programmers to build applications that ran on such networks, controlling devices irrespective of vendor or specific model characteristics.

Typically, a home audiovisual system will include a number of devices. Examples of such devices are televisions, radios, CD players, a pair of speakers, VCRs, DVD players, etc. Many of these devices may be produced by different manufacturers and function independently of the other AV devices owned by a user. The HAVi network allows interoperability between these devices. As each device becomes known to the HAVi network, it is added to the HAVi networking system. Each appliance is automatically registered by HAVi so that other devices know what it is capable of. Since HAVi has standardized the APIs of the most common AV functions, this interoperability is possible.

For example, a VCR integrated into the HAVi network can search for an appliance that offers a clock with the time-of-day also on the HAVi network, and automatically set its own timers. This may be done with the HAVi network without the aid of a home personal computer (PC).

The interconnection medium used in a HAVi network is IEEE 1394. The IEEE 1394 serial communication bus standard (1394) is used as a local bus platform to provide the common messaging system. It carries commands and status information as well as digital audio and digital video signals between devices. Generally, 1394 has been a good interconnection medium because it has more than enough capacity to simultaneously carry multiple digital audio and video streams around the house. Also, 1394 provides support for digital copy protection.

While IEEE 1394 enables HAVi systems to offer guaranteed high levels of service, it restricts the range of devices that can participate in the home network. Generally, electronic devices made for home entertainment purposes are becoming more and more complex and with greater capabilities. This is in direct correlation with the continuing emergence of a wide range of low cost, high-quality wired and wireless networks and end-systems. Many of these devices are considered a part of the home AV network but do not support 1394 connections. Instead, these devices usually support Internet Protocol (IP) on a wide range of wired/wireless networks such as the Internet. Examples of such devices are personal digital assistants (PDAs) oriented to home audio visual (AV) and MP3 players such as a Music-Clip™ player manufactured by Sony Corporation.

Consumers are also increasingly purchasing such devices. As they purchase these devices, the HAVi network should allow these devices to be connected to the HAVi network regardless of a lack of 1394 support.

Currently, the HAVi specification accommodates the connection of non-1394 devices as extensions to 1394 devices when connected. The DCM for a hosting device is extended with the connected device functionality. However, this approach does not extend the HAVi network to IP devices. Also, it does not support running HAVi applications on IP devices.

One approach to integrate IP devices into the HAVi network may be to reengineer or rewrite the HAVi specification to integrate internet protocol devices into the HAVi network. Wholesale changes in the HAVi specification, however, may be costly and inefficient. Therefore, what is needed is a fairly cost-efficient method and apparatus for integrating IP devices into a HAVi network.

SUMMARY OF THE INVENTION

Accordingly, the present invention is a method and an apparatus for integrating IP devices into a HAVi network. An Internet Protocol (IP) and HAVi compliant device acts as a controller in the HAVi network and communicates with at least one HAVi compliant device using HAVi application programming interfaces (APIs). A server on the controller communicates with at least one IP device having a proxy and an IP and HAVi API. The server includes at least one IP device device control module (IP device DCM) corresponding to the IP device. The IP device providing API support to translate and relay calls between the proxy and the server so that at least one HAVi compliant device can communicate with the IP device.

BRIEF DESCRIPTION OF THE DRAWINGS

The present invention is illustrated by way of example, and not limitation, in the figures of the accompanying drawings in which.

DETAILED DESCRIPTION

A method and an apparatus for integrating an Internet Protocol (IP) device into a home audio/video initiative (HAVi) are disclosed. Reference will now be made in detail to the embodiments of the invention, examples of which are illustrated in the accompanying drawings. While the invention will be described in conjunction with numerous embodiments, it will be understood that they are not intended to limit the invention to these embodiments. On the contrary, the invention is intended to cover alternatives, modifications and equivalents, which may be included within the spirit and scope of the invention as defined by the claims.

The present invention provides a method and apparatus for integrating an internet protocol (IP) device into a home audio/visual initiative (HAVi) network. The system includes a HAVi network with a plurality of devices connected to the HAVi network via a IEEE 1394 bus. A number of internet protocol devices are communicating and operating with the HAVi network via an IP protocol.

The HAVi network has been used increasingly to provide seamless interoperability between home AV devices. The underlying structure includes a set of interconnected clusters of appliances. Each cluster will work as a set of interconnected devices to provide a set of services to users. Often, one device will act as a controller for a set of other devices. However, a controller is not required for HAVi to operate.

Generally, the interoperability model in HAVi provides (1) support for existing devices; (2) a default control model; (3) means to extend the default control model when new devices or functionality are brought to market; and (4) a common means for device representation. To achieve the above, the HAVi architecture defines three types of nodes in the home network: Full AV nodes (FAV), Intermediate AV nodes (IAV) and Base AV nodes (BAV). Further detail about the HAVi network including the notation and nomenclature, architecture overview, and system model of a HAVi network are described in U.S. Pat. No. 6,085,236, filed on Jan. 6, 1999, commonly assigned herewith and incorporated herein by reference.

Figure 1:
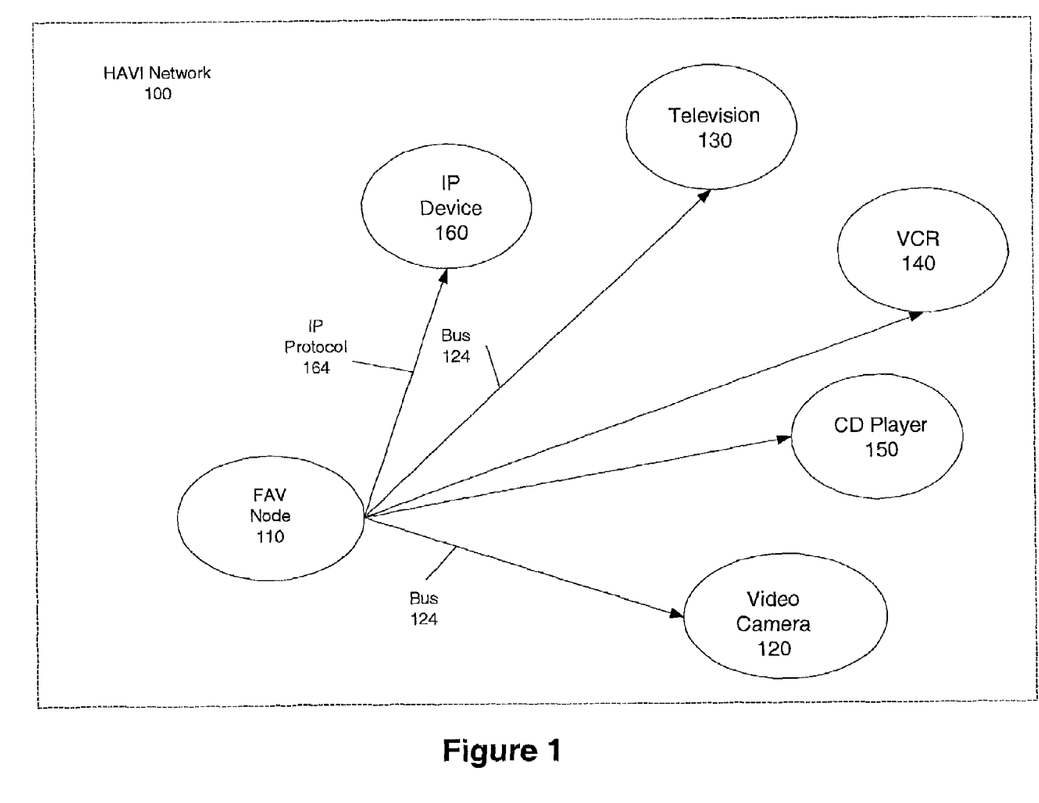
FIG. 1 illustrates a single FAV cluster HAVi network in accordance with one embodiment of the invention.

In FIG. 1, one embodiment of a HAVi network 100 is shown. The HAVi network 100 includes an FAV node 110 functioning as a controller. An FAV node is a device that contains a complete instance of the AV software model. This type of node generally has a richer set of resources and is capable of supporting a complex software environment. The primary distinguishing feature of an FAV node is that it is able to take control responsibility for less sophisticated devices and does this by loading a control module, usually from the less sophisticated device, and executing it locally.

In the embodiment shown in FIG. 1, FAV node 110 acts as a controller for the HAVi network 100 and connected devices. Connected to the HAVi network 100 are several devices including a video camera 120, a television 130, a VCR 140, and a CD player 150. These devices are connected via a bus 124. Generally, the bus 124 used to connect devices to the HAVi network 100 is the IEEE 1394 bus standard. An IP device 160 is also integrated into the HAVi network 100 via an IP protocol 164.

One example of an IP device that could be connected to the HAVi network is a personal digital assistant (PDA). Another example is an MP3 player such as a MusicClip™ player, manufactured by Sony Corporation. These devices would be considered home audio/visual devices in terms of the HAVi network. However, both of these devices do not have an IEEE 1394 bus connection and could not therefore normally participate in a HAVi network. The present invention allows IP devices such as these to participate in a HAVi network via an IP protocol.

The IP protocol may be implemented on a wireless connection or a wired connection. In one embodiment, the IP protocol may be implemented on a wireless connection such as an IEEE 802.11b connection. In another embodiment, the wireless connection may be a Bluetooth™. The IP networking protocol may also be a wired connection such as Ethernet. In other embodiments, the IP protocol maybe implemented on fiber, optical, or cable networks.

Figure 2:
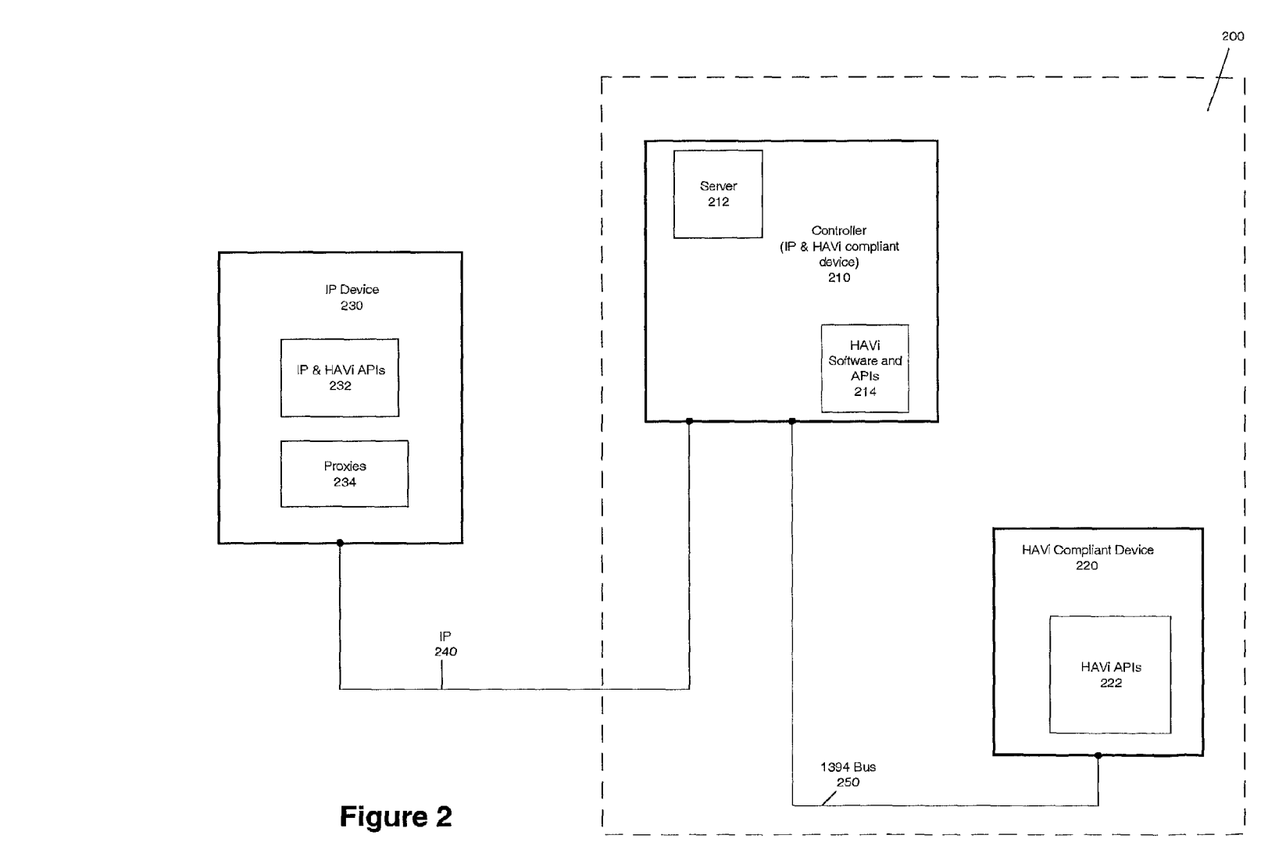
FIG. 2 illustrates a block diagram of one embodiment of an IP device integrated into a HAVi network.

In FIG. 2, a block diagram of one embodiment of an IP device 230 integrated into a HAVi network 200 is shown. The HAVi network 200 includes an IP and HAVi compliant device, i.e., an FAV, acting as a controller 210. The controller 210 runs a server 212 and includes HAVi software and APIs 214. A HAVi compliant device 220 is shown to be included in the HAVi network 200 and coupled to the controller 210 via a 1394 bus 250. In FIG. 2, an IP device 230 has also been integrated into the HAVi network via an IP connection 240 to the controller 210. The IP device 230 includes a set of proxies 234 and IP and HAVi APIs 232. In one embodiment, the proxies 234 and APIs 232 are downloaded onto the IP device 230 from the Internet. In an alternative embodiment, the proxies 234 and APIs 232 may be manually installed onto the IP device 230.

In the embodiment shown in FIG. 2, a (FAV or IAV) device acts as a controller 210 to access and control other HAVi compliant devices 220 and IP devices 230. In an alternative embodiment, an IP device may control the FAV or IAV device as well as other HAVi compliant devices coupled to a HAVi network.

The set of proxies 234 communicate with the server 212 on the controller 210. The server 212 acts as a proxy manager and accesses the HAVi software 214 to relay HAVi related information to the IP device 230. The IP device 230 accesses a HAVi compliant device 220 by running a HAVi application on the IP device 230 using the IP and HAVi APIs 232. In an alternative embodiment, a HAVi compliant device 220 accesses the IP device 230 by sending commands to an IP device control module (IP DCM) on the controller 210 that corresponds to the IP device 230. The IP DCM is a logical representation of the IP device 230 that provides an API used to send control commands to the IP device 230 by the server 212 on the controller 210. The IP device 230 has IP and HAVi APIs 232 that provide API support to translate and relay calls between the server 212 and the IP device 230. The HAVi compliant devices 220 communicate with the server 210 by using HAVi APIs 222 and communicating via a communication medium such as the IEEE 1394 network.

Figure 3:
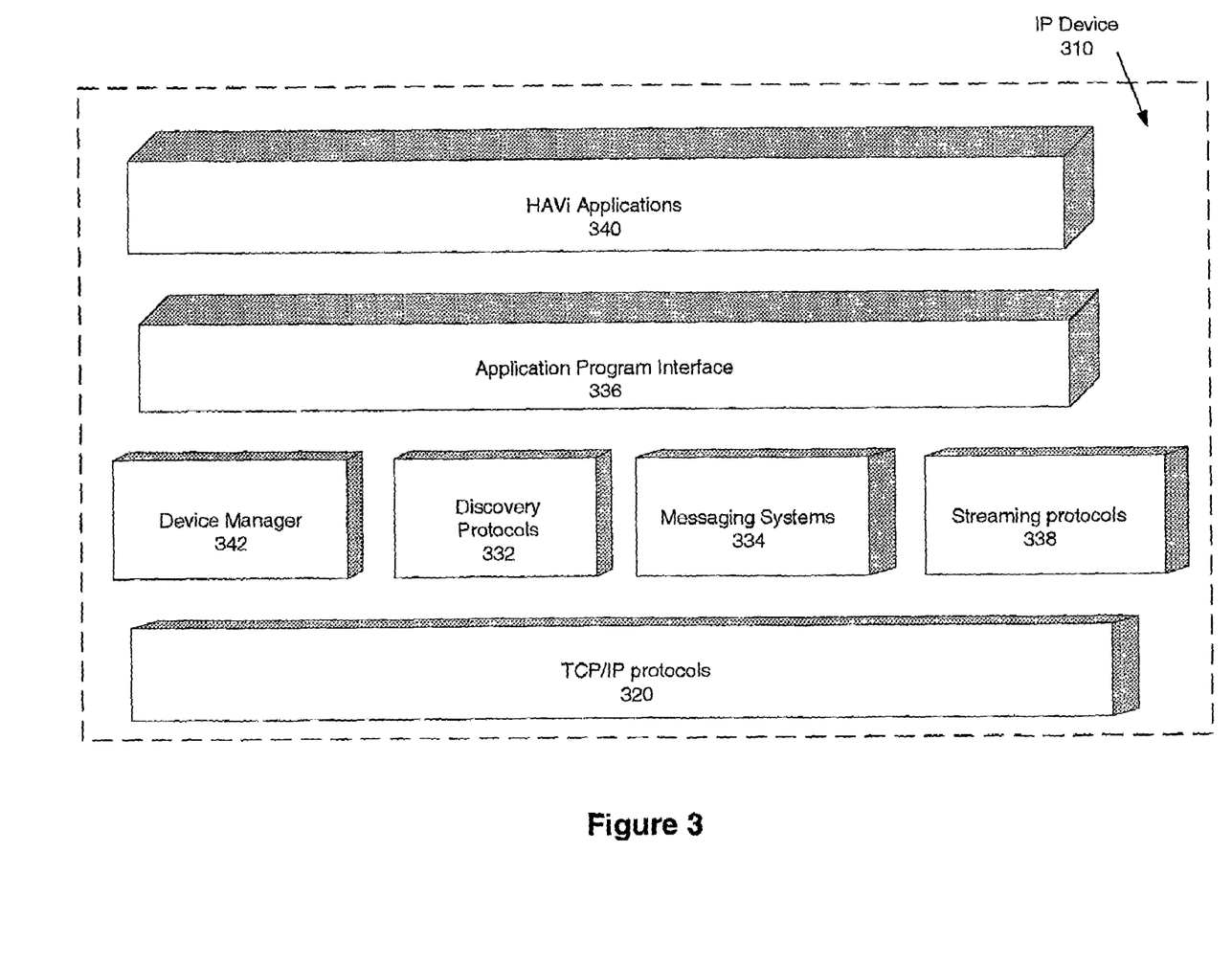
FIG. 3 illustrates a logical diagram of one embodiment of the client side architecture on an IP device.

In FIG. 3, one embodiment of the client side architecture of an IP device 310 is shown. The IP device 310 implements TCP/IP protocols 320. This is the format by which the IP device 310 communicates with other devices coupled to the HAVi network. The IP device 310 also includes an application program interface (API) 336 that allows the IP device 310 to translate and relay calls to and from devices coupled to the HAVi network. The APIs 336 assists IP devices in hosting HAVi applications 340.

In different embodiments, the APIs 336 have a library of functions. In one embodiment, the API 336 may include C++ HAVi/IP APIs. In another embodiment, the API 336 may include Java HAVi APIs. These libraries take care of packaging a command and sending the command to the server, i.e., setting up a stream. However, these libraries do not deal with the actual content of the stream. In one embodiment, JMF and C++ graphic libraries are used in conjunction with the above-mentioned libraries and a streaming module to get the stream data and display the stream data.

The IP device 310 also has appreciable code to support discovery protocols 332, a messaging system 334, and streaming protocols 338 that allow the IP device 310 to communicate and operate within the HAVi network. The discovery protocols 332 search and determine whether the IP device is coupled to a HAVi network. The messaging system 334 configures and packages any messages that are sent out from the IP device 310 to other devices coupled to the HAVi network as well as receiving any messages sent to the IP device 310. In addition, the messaging system 334 enables the IP device 310 to communicate with devices coupled to the HAVi network to let them know that the IP device 310 is coupled to the HAVi network. FIG. 3 also shows a device manager 342 that is linked with and may be controlled by an IP DCM on a controller device. The device manager 342 receives commands from the HAVi network and accesses hardware, i.e., display a video or access a filed stored locally. In one embodiment, combining the device manager 342 with the streaming protocols 338 allows a video from a HAVi device to be displayed on the IP device 310.

Figure 4:
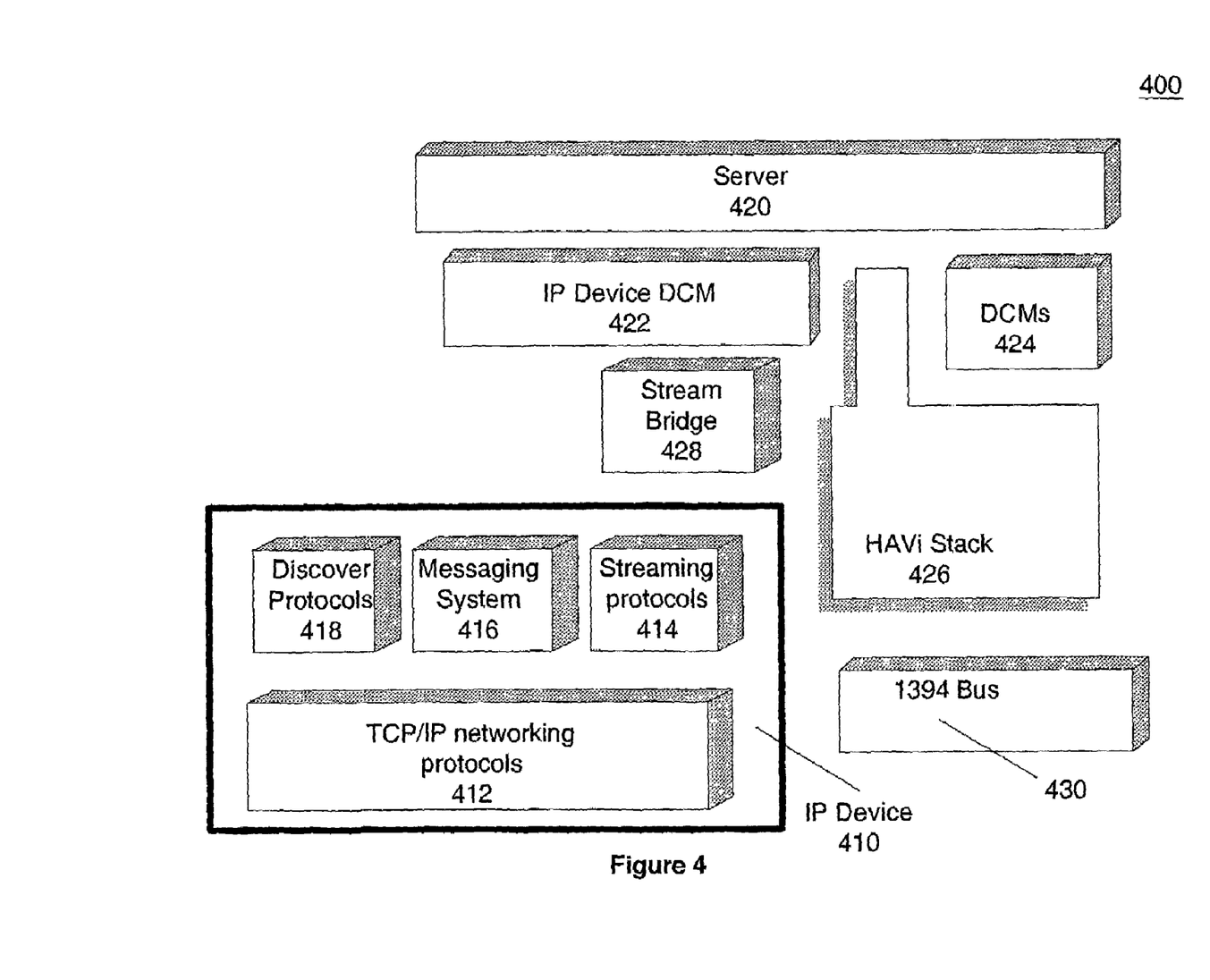
FIG. 4 illustrates a logical diagram of one embodiment of the server side architecture of a HAVi Network.

FIG. 4 also shows the messaging system 416 and the discovery protocols 418 on the server side architecture. Referring to FIG. 4, one embodiment of the server side architecture of a HAVi network is shown. In this embodiment, the server side architecture as shown is on an FAV device. The FAV device acts as a controller for the HAVi network 400. From the server side, the FAV device implements discovery code to seek and find devices coupled to the HAVi network 400. A server 420 receives messages from any devices connected to the HAVi network 400. From HAVi compliant devices, messages are sent via an IEEE 1394 bus 430 to the server 420. From IP devices, messages are sent via an IP. Any messages and information from the server stub 420 are pushed down into a HAVi stack 426.

The HAVi stack 426 includes a device manager. As the FAV finds new devices coupled to the HAVi network 400, the device manager creates a device control module for each new device. These device control modules (DCMs) 424 are instantiated for all the devices on the HAVi network 400. The DCMs 424 allow the HAVi network 400 to interface with each HAVi compliant device and IP device DCMs 422 allow the HAVi network 400 to interface with each IP device. In this embodiment, the IP device DCMs 422 are instantiated independently of bus reset events. Bus reset, typically, occurs when any new HAVi compliant device is coupled to the HAVi network.

In the embodiments shown in both FIG. 3 and in FIG. 4, the IP device can access audio and video content from the HAVi network. In FIG. 3, streaming protocols 338 allow the IP device 310 to access audio and video content from the HAVi network. In FIG. 4, the streaming protocols 414 are also shown. In FIG. 4, the server side architecture implements a stream bridge 428 which captures the audio and video content from devices coupled to the HAVi network 400 and relays that content to the IP device 410. The IP device 410 via the streaming protocols 414 has the ability to use the audio and video content received from any device connected to the HAVi network 400.

Figure 5:
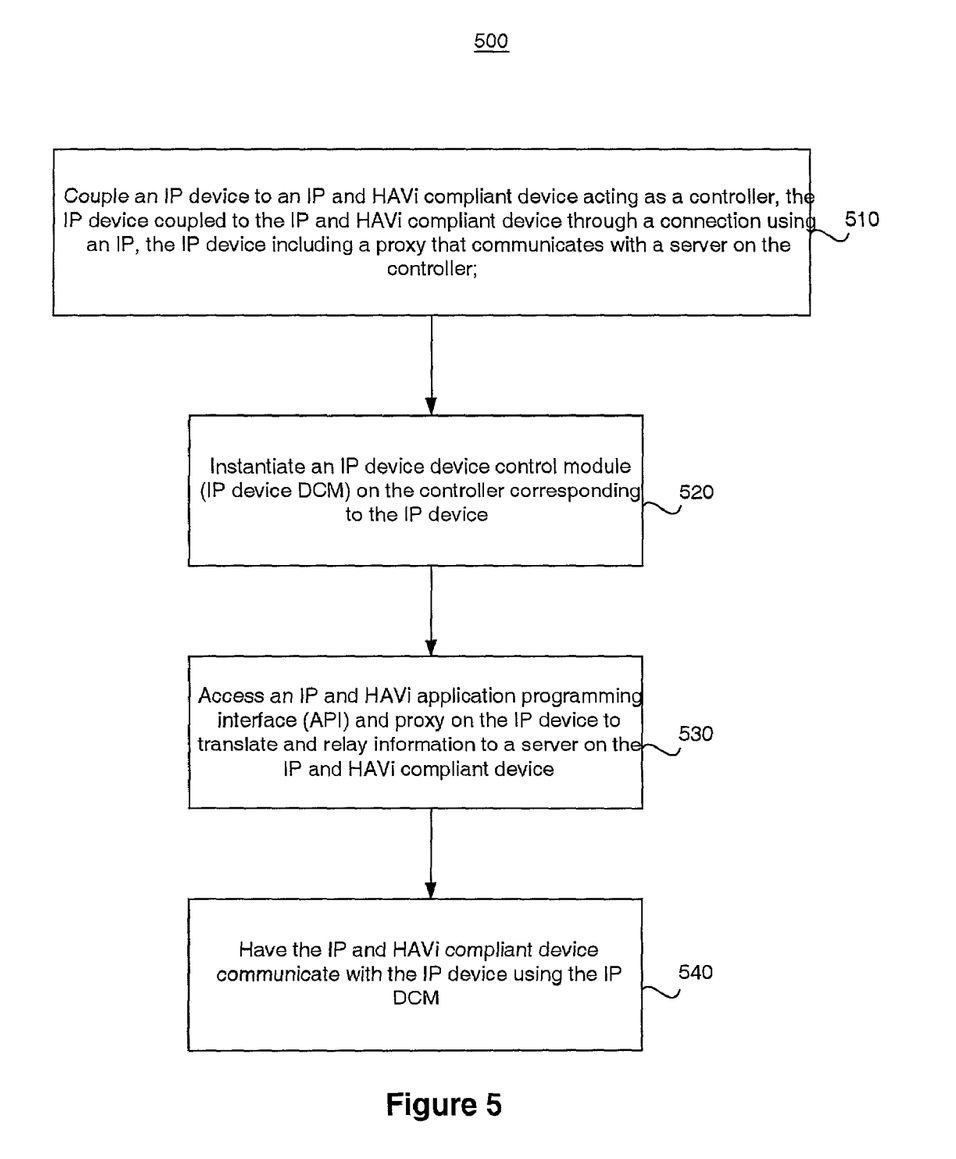
FIG. 5 illustrates a flow diagram of a process of integrating an IP device into a HAVi network in accordance with one embodiment of the invention.

FIG. 5 shows a flow chart of a process 500 of integrating an IP device into a HAVi network in accordance with one embodiment of the present invention. First, at processing block 510, an IP device is coupled to a first IP and HAVi compliant device acting as a controller through a connection using an IP. In one embodiment, this may be done automatically by the IP device using discovery protocols and a messaging system. In an alternative embodiment, the IP and HAVi compliant device may discover the IP device and automatically instantiate an IP DCM for the IP device. In yet another alternative embodiment, the user of the IP device may manually connect the IP device to the HAVi network. The IP device includes a proxy that communicates with a server on the controller.

At processing block 520, an IP device DCM is instantiated on the controller to correspond to the IP device. The IP device DCM is a logical representation of the IP device that provides an API used to send control commands to the IP device by the controller. At processing block 530, the IP and HAVi API and proxy on the IP device translate and relay information to the server on the first IP and HAVi complaint device. At processing block 540, the coupling of the IP device to the IP and HAVi compliant device allows the IP and HAVi compliant device to communicate with the IP device using the IP DCM.

Figure 6:
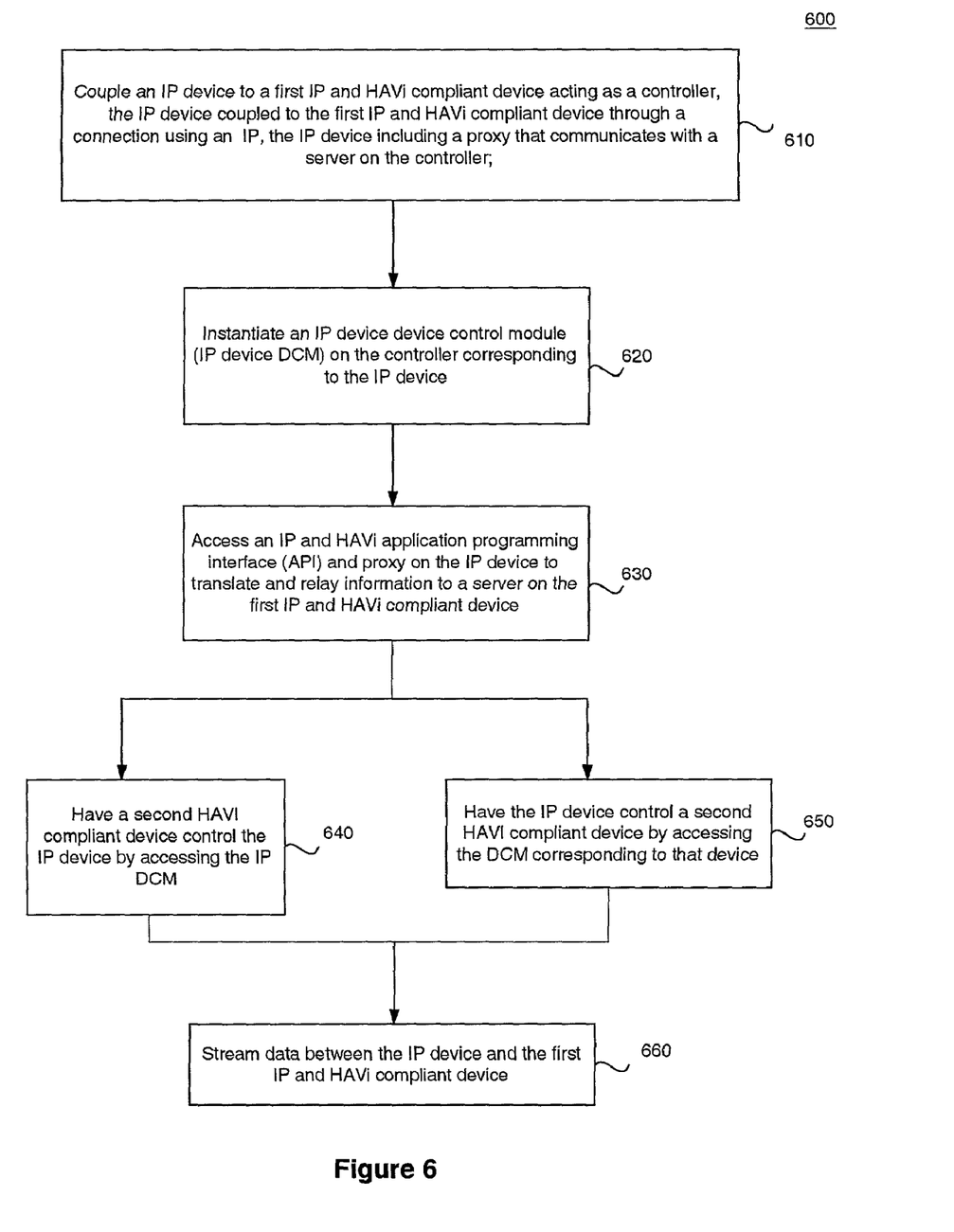
FIG. 6 illustrates a flow diagram of a process of integrating an IP device into a HAVi network in accordance with another embodiment of the invention.

FIG. 6 shows a flow chart of a process 600 of integrating an IP device into a HAVi network in accordance with one embodiment of the present invention. First, at processing block 610, an IP device is coupled to a first IP and HAVi compliant device acting as a controller through a connection using an IP. The IP device includes a proxy that communicates with a server on the controller.

At processing block 620, an IP device DCM is instantiated on the controller to correspond to the IP device. The IP device DCM is a logical representation of the IP device that provides an API used to send control commands to the IP device by the controller. At processing block 630, the IP and HAVi API and proxy on the IP device translate and relay information to the server on the first IP and HAVi complaint device. At processing block 640, the coupling of the IP device to the IP and HAVi compliant device allows the IP and HAVi compliant device to communicate with the IP device using the IP DCM.

In one embodiment, as illustrated at processing block 640, a second HAVI compliant device controls the IP device by accessing the IP device DCM. In an alternative embodiment, as illustrated at processing block 650, the IP device controls a second HAVi compliant device by accessing the DCM corresponding to that device. In one embodiment, data is streamed between the IP device and the IP and HAVi compliant device at processing block 660.

An example of this type of interaction is a PDA connected to the home network via a wireless connection including a Bluetooth™ connection. The PDA could run a host of applications such as acting as a remote controller that provides network-oriented features far richer than those available with today's remote controllers. The PDA can integrate web based information since it has an AV display.

Another example of running HAVi applications on a personal digital assistant is transferring AV content between home and in-car AV devices. The PDA can also act as a portal for purchasing AV content for download to the user's HAVi network.

The present invention opens up any number of possible new uses for IP devices when integrated with a HAVi network. A method and apparatus for integrating an IP device into a HAVi network has been described. Although the present invention has been described with reference to specific embodiments, the specification and drawings are to be regarded as illustrative rather than restrictive.

What is claimed is:

1. A controller comprising at least one Home Audio Visual Initiative (HAVi) server that communicates with at least one HAVi compliant device using a HAVi application programming interface (API) and further communicates with at least one proxy on at least one Internet Protocol (IP) device using an IP and HAVi API, the server communicating with the IP device via the Internet protocol, the IP and HAVi API providing API support to translate and relay calls between the proxy and the server so that each one of the at least one HAVi compliant device and the IP device controls the other one of the devices.

2. The controller as set forth in claim 1 further comprising an IP device control module (DCM), wherein the at least one HAVi compliant device controls the IP device by accessing a DCM associated with the IP device.

3. The controller as set forth in claim 1, wherein the HAVi compliant device is physically located on the controller.

4. The controller as set forth in claim 2, further comprising a HAVi stack that enables the IP device DCM to be instantiated independently of bus reset events.

5. The controller as set forth in claim 1, wherein the server communicates with IP devices across a first communication medium and HAVi compliant devices across a second communication medium.

6. The controller as set forth in claim 5, wherein the first communication medium is selected from the group consisting of fiber, optical, cable, wire and wireless networks.

7. The controller as set forth in claim 4, wherein the second communication medium is an IIEEE 1394 network.

8. The controller as set forth in claim 1, further comprising a stream bridge configured to capture content from a first device of IP and HAVi compliant devices coupled to the controller and relay it to a second device of IP and HAVi compliant devices.

9. The controller as set forth in claim 1, wherein the controller is selected from the group consisting of a HAVi full audio/visual device and an intermediate audio/visual device.

10. A method of integrating an Internet Protocol (IP) device into a Home Audio Visual Initiative (HAVi) network comprising:
    coupling at least one IP device to a first HAVi compliant device acting as a controller, the IP device coupled to the first HAVi compliant device through a connection using the Internet protocol, the IP device including a proxy that communicates with a server on the controller;
    accessing an IP and HAVi application programming interface (API) and the proxy on the IP device to translate and relay information to a server on the first HAVi compliant device; and
    controlling each one of the IP device and a second HAVi compliant device by the other one of the devices through the proxy.

11. The method as set forth in claim 10 further comprising instantiating an IP device control module (IP device DCM) on the controller corresponding to the IP device, wherein the IP device DCM is instantiated independently of bus reset events.

12. The method as set forth in claim 10, wherein the second HAVi compliant device is selected from the group consisting of the first HAVi compliant device and a device coupled to the first HAVi compliant device through a network.

13. The method as set forth in claim 10, further comprising streaming data between the IP device and the controller.

14. A method of integrating an Internet protocol network device into a home audio/video network comprising:
    coupling an Internet Protocol network device to a home audio/video network device acting as a controller, the Internet Protocol network device coupled to the home audio/video network device through a connection using an Internet Protocol, the Internet Protocol network device including a proxy that communicates with a server on the controller;
    accessing an application programming interface and proxy on the Internet Protocol network device to translate and relay information to the server, the application programming interface compliant with a dedicated home audio/video network protocol and the Internet Protocol; and
    controlling each one of a different home audio/video network device and the Internet Protocol network device by the other of the devices through the proxy.

15. The method as set forth in claim 14 further comprising instantiating a device control module on the controller, the DCM corresponding to the Internet Protocol network device, wherein one of the home audio/video network devices controls the Internet Protocol network device by accessing the device control module.

16. The method as set forth in claim 14, wherein the home audio/video network and Internet Protocol network devices communicate through mediums selected from the group consisting of fiber, optical, cable, wire and wireless networks.

17. The method as set forth in claim 14, further comprising providing a stream bridge configured to capture content from one of the different home audio/video network and Internet Protocol network devices and relay it to the other one of the devices.

18. A system for integrating an Internet Protocol (IP) device into a Home Audio Visual Initiative (HAVi) network comprising:
    means for coupling at least one IP device to a first HAVi compliant device acting as a controller, the IP device coupled to the first HAVi compliant device through a connection using the Internet protocol, the IP device including a proxy that communicates with a server on the controller;
    means for accessing an IP and HAVi application programming interface (API) on the IP device to translate and relay information to the first HAVi compliant device; and
    means for coupling a second HAVi compliant device to the HAVi network, wherein each one of the second HAVi compliant device and the IP device controls the other one of the devices.

19. The system as set forth in claim 18 further comprising means for instantiating an IP device control module (IP device DCM) on the controller corresponding to the IP device, wherein at least one HAVi compliant device controls the IP device by accessing a DCM corresponding to the IP device.

20. The system as set forth in claim 19, wherein the IP device DCM is instantiated independently of bus reset events.

21. The system as set forth in claim 18, further comprising means for streaming data between the IP device and the controller.

22. A home audio/video network comprising:
    a controller comprising a server and a first application program interface that is compliant with a dedicated home audio/video network protocol;
    a home network device coupled to the controller, the home network device comprising a second application program interface compliant with the dedicated home audio/video network protocol, wherein the second application program interface is operable to communicate commands between a program executing on the home network device and the server through the first application program interface; and an Internet Protocol network device coupled to the controller, the Internet Protocol network device comprising a proxy and a third application program interface that is compliant with the dedicated home audio/video network protocol and with an Internet Protocol, wherein the third application program interface is operable to translate and relay commands between the server and the proxy, and is further operable to translate and relay commands between the proxy and a program executing on the Internet Protocol network device to allow the home and Internet Protocol network devices to control each other.

23. A home audio/video network controller comprising:

a server and a first application program interface compliant with a dedicated home audio/video network protocol, wherein the first application program interface is operable to communicate commands between the server and a program executing on a home network device through a second application program interface that is resident on the home network device and compliant with the dedicated home audio/video network protocol, and wherein the server is operable to communicate commands to and from an Internet Protocol network device through a proxy and a third application program interface that are resident on the Internet Protocol network device, the third application program interface compliant with the dedicated home audio/video network protocol and with an Internet Protocol, wherein the third application program interface translates and relays commands between the server and the proxy and further translates and relays commands between the proxy and a program executing on the Internet Protocol network device to allow the home and Internet Protocol network devices to control each other.

24. The home audio/video network controller as set forth in claim 23 further comprising a device control module corresponding to the Internet Protocol network device, wherein the home audio/video network device controls the Internet Protocol network device by accessing the device control module.

25. The home audio/video network controller as set forth in claim 23 wherein the home audio/video and Internet Protocol network devices communicate through mediums selected from the group consisting of fiber, optical, cable, wire and wireless networks.

26. The home audio/video network controller as set forth in claim 23 further comprising a stream bridge configured to capture content from one of the home audio/video and Internet Protocol network devices and relay it to the other one of the devices.

27. An Internet Protocol network device comprising:

a proxy and a first application program interface compliant with a dedicated home audio/video network protocol and with an Internet Protocol, wherein the first application program interface is operable to translate and relay commands between the proxy and a program executing on the Internet Protocol network device, and wherein the first application program interface is further operable to translate and relay commands between the proxy and a server coupled to a home network device to allow the Internet Protocol network device and the home network device to control each other, the server resident in a home audio/video network controller that includes a second program interface to communicate commands between a program executing on the home network device and the server.

28. The Internet Protocol network device as set forth in claim 27 wherein content is streamed between the Internet Protocol network device and the home audio/video network controller.

* * * * *